(12) United States Patent
Douglas et al.

(10) Patent No.: US 8,504,280 B2
(45) Date of Patent: Aug. 6, 2013

(54) FUEL CONTROL DIAGNOSTIC SYSTEM AND METHOD

(75) Inventors: Scot A. Douglas, Howell, MI (US); Jason Daniel Mullins, Howell, MI (US)

(73) Assignee: GM Global Technology Operations LLC

( * ) Notice: Subject to any disclaimer, the term of this patent is extended or adjusted under 35 U.S.C. 154(b) by 354 days.

(21) Appl. No.: 12/886,981

(22) Filed: Sep. 21, 2010

(65) Prior Publication Data

US 2012/0072092 A1    Mar. 22, 2012

(51) Int. Cl.
*G06F 19/00* (2011.01)
*F01N 3/10* (2006.01)
*F02D 41/30* (2006.01)

(52) U.S. Cl.
USPC ................. 701/114; 60/277; 60/286; 701/104

(58) Field of Classification Search
USPC   701/102, 103, 107, 114; 123/479; 73/114.69, 73/114.75; 60/277, 286, 295, 297, 303, 311; 702/182, 183, 185
See application file for complete search history.

(56) References Cited

U.S. PATENT DOCUMENTS

| | | | | |
|---|---|---|---|---|
| 6,032,461 | A * | 3/2000 | Kinugasa et al. | 60/295 |
| 6,983,589 | B2 * | 1/2006 | Lewis et al. | 60/277 |
| 8,046,153 | B2 * | 10/2011 | Kurtz et al. | 701/103 |
| 8,265,852 | B2 * | 9/2012 | Yanakiev et al. | 701/102 |
| 8,297,266 | B2 * | 10/2012 | Takubo | 123/703 |
| 2006/0201142 | A1 | 9/2006 | Marlett et al. | |

OTHER PUBLICATIONS

U.S. Appl. No. 12/769,142, filed Apr. 28, 2010, Patrick Barasa.
U.S. Appl. No. 12/769,185, filed Apr. 28, 2010, Patrick Barasa.
U.S. Appl. No. 12/853,480, filed Aug. 10, 2010, Patrick Barasa.

* cited by examiner

*Primary Examiner* — Stephen K Cronin
*Assistant Examiner* — Carl Staubach (57) ABSTRACT

A diagnostic system for an engine includes an error detection module and a diagnostic module. The error detection module selectively detects a fuel control error based on a change in a fuel correction value used to determine a quantity of fuel supplied directly to an exhaust system. The diagnostic module identifies a cause of the fuel control error based on a period since a last refueling event. The diagnostic module identifies the cause as one of variation in an actual heating value of the fuel and faulty operation of a fuel injection system that supplies the fuel. The diagnostic module further identifies the cause based on a first amount of the fuel contained in a fuel tank at a start of the last refueling event and a second amount of the fuel added to the fuel tank during the last refueling event. A control system and method are also provided.

14 Claims, 3 Drawing Sheets

FUEL CONTROL DIAGNOSTIC SYSTEM AND METHOD

FIELD

The present disclosure relates to control systems and methods for an internal combustion engine, and more particularly, to diagnostic systems and methods for fuel control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines used to power a vehicle combust fuel in the presence of air to produce power. The combustion of the fuel produces exhaust that contains various gases and particulate matter (PM). The exhaust may be treated in an exhaust system to reduce concentrations of certain constituent gases and the PM. For example, a catalytic converter may reduce the concentration of gases such as carbon monoxide (CO) and hydrocarbons (HC) in the exhaust. The PM may be filtered from the exhaust by a PM filter.

Over time, PM filtered from the exhaust accumulates within the PM filter and begins to restrict the flow of exhaust. PM that has accumulated within the PM filter may be removed by a process referred to as regeneration. During regeneration, PM within the PM filter is combusted. Typically, regeneration is accomplished by raising the temperature of the PM filter above a regeneration temperature. At temperatures above the regeneration temperature, PM accumulated within the PM filter will begin to combust. The temperature of the PM filter is held above the regeneration temperature for a period until a desired amount of the PM is combusted.

In some regeneration processes, a hydrocarbon injection (HCI) system injects fuel into the exhaust and the fuel is combusted in the catalytic converter to produce heat for raising the temperature of the PM filter above its regeneration temperature. Control systems have been developed to control the amount of heat produced by controlling the amount of fuel delivered to the exhaust. Diagnostic systems have been developed to detect problems with the operation of the HCI system. For example, such systems may detect problems with a fuel injector used to inject the desired amount of fuel, such as a sticking problem or a clogging problem.

When a problem is detected, a fault code may be stored in memory and remedial action may be initiated. For example, a malfunction indicator lamp (MIL) may be illuminated to alert a driver of the problem. Regeneration may be suspended and/or a remedial control strategy for supplying fuel to the exhaust during regeneration may be initiated.

SUMMARY

In one form, the present disclosure provides a diagnostic system for an engine that includes an error detection module and a diagnostic module. The error detection module selectively detects a fuel control error based on a change in a fuel correction value used to determine a quantity of fuel supplied directly to an exhaust system of the engine. The diagnostic module identifies a cause of the fuel control error based on a first period since a last refueling event.

In one feature, the error detection module may detect the fuel control error when a difference between a current fuel correction value and a previous fuel correction value is greater than a predetermined difference within a predetermined period. In another feature, the diagnostic module identifies the cause as one of variation in an actual heating value of the fuel and faulty operation of a fuel injection system used to supply the fuel to the exhaust system.

In yet another feature, the diagnostic module further identifies the cause based on a first amount of the fuel contained in a fuel tank at a start of the last refueling event and a second amount of the fuel added to the fuel tank during the last refueling event. In a related feature, the diagnostic module may further identify the cause based on a first percent change in the fuel correction and a second percent value, wherein the second percent value is based on the first and second amounts. In another related feature, the diagnostic module may identify the cause as a variation in heating values of the fuel when the first percent change is less than the second percent value. In yet another related feature, the diagnostic module may identify the cause as faulty operation of a fuel injection system used to supply the fuel to the exhaust system when the first percent change is greater than the second percent value.

In still another feature, the diagnostic module may further identify the cause based on a second period between successive regeneration events of a particulate matter filter.

The present disclosure also provides a control system for an engine that includes a fuel control module, a fuel correction module, an error detection module, and a diagnostic module. The fuel control module supplies a quantity of fuel directly to an exhaust system of the engine based on a fuel correction value. The fuel correction module determines a current fuel correction value based on a previous fuel correction value and a difference between an estimated energy of the quantity and an amount of heat produced by combusting the quantity. The error detection module selectively detects a fuel control error when a second difference between the current fuel correction value and a previous fuel correction value is greater than a predetermined difference within a predetermined first period. The diagnostic module identifies a cause of the fuel control error based on a second period since a last refueling event.

In one feature, the diagnostic module further identifies the cause based on a first amount of the fuel contained in a fuel tank at a start of the last refueling event and a second amount of the fuel added to the fuel tank during the last refueling event. In a related feature, the diagnostic module may further identify the cause based on a first percent change in the fuel correction and a second percent value, wherein the second percent value is based on the first and second amounts.

In another form, the present disclosure provides a method for an engine. The method includes selectively detecting a fuel control error based on a change in a fuel correction value used to determine a quantity of fuel supplied directly to an exhaust system of the engine. The method further includes identifying a cause of the fuel control error based on a first period since a last refueling event.

In one feature, the selectively detecting may include detecting the fuel control error when a difference between a current fuel correction value and a previous fuel correction value is greater than a predetermined difference within a predetermined period. In another feature, the identifying includes identifying the cause as one of variation in an actual heating value of the fuel and faulty operation of a fuel injection system used to supply the fuel to the exhaust system.

In yet another feature, the identifying further includes identifying the cause based on a first amount of the fuel contained in a fuel tank at a start of the last refueling event and a second amount of the fuel added to the fuel tank during the last refueling event. In a related feature, the identifying may further include identifying the cause based on a first percent change in the fuel correction and a second percent value, wherein the second percent value is based on the first and second amounts. In another related feature, the identifying may further include identifying the cause as a variation in heating values of the fuel when the first percent change is less than the second percent value. In yet another related feature, the identifying may further include identifying the cause as faulty operation of a fuel injection system used to supply the fuel to the exhaust system when the first percent change is greater than the second percent value.

In still another feature, the identifying may further include identifying the cause based on a second period between successive regeneration events of a particulate matter filter.

In further features, the method may further include determining a current fuel correction value based on a previous fuel correction value and a difference between an estimated energy of the quantity and an amount of heat produced by combusting the quantity.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

During regeneration of a PM filter of an engine, a control module may raise the temperature of the PM filter above its regeneration temperature by injecting a quantity of fuel into the exhaust that is combusted in a catalytic converter located upstream of the PM filter. Combustion of the fuel generates heat that raises the temperature of the exhaust entering the PM filter. The control module may determine a desired quantity of fuel to be injected by an HCI system based on a desired amount of heat to be produced and a heating value of the fuel.

An actual quantity of fuel injected may differ from the desired quantity due to variation in the performance of the HCI system. Additionally, an actual amount of heat produced by combustion of the fuel may differ from the desired amount due to variation in the actual heating value of the fuel. The actual heating value may vary due to batch variation in the composition of the fuel and/or seasonal transitions between winter-grade and summer-grade fuels.

A control module of the HCI system may compensate for the differences by implementing closed-loop control of the desired quantity of fuel via a learned fuel correction associated with the heating value. The control module may periodically adjust the fuel correction based on one or more measured engine operating parameters.

The control module may detect a problem with the HCI system based on one or more diagnostic criteria. For example, the control module may detect a problem when the fuel correction exceeds a predetermined value and/or changes at a rate greater than a predetermined rate. The control module may set a diagnostic trouble code (DTC) associated with the HCI system based on the problem detected.

Variation in the actual heating value of the fuel may falsely trigger a DTC associated with faulty operation of the HCI system. The control system and method of the present disclosure prevent false DTCs by determining whether fuel has been added to the fuel tank recently. When fuel has been added, the control system and method provide an additional check before triggering the DTC. The additional check distinguishes between changes in the fuel correction caused by variation in the fuel and changes caused by faulty operation of the HCI system. The additional check distinguishes the changes and thereby avoids falsely triggering the DTC based on a potential difference in the actual heating value due to the additional fuel added to the tank. The additional check can be implemented with existing diagnostic criteria.

Figure 1:
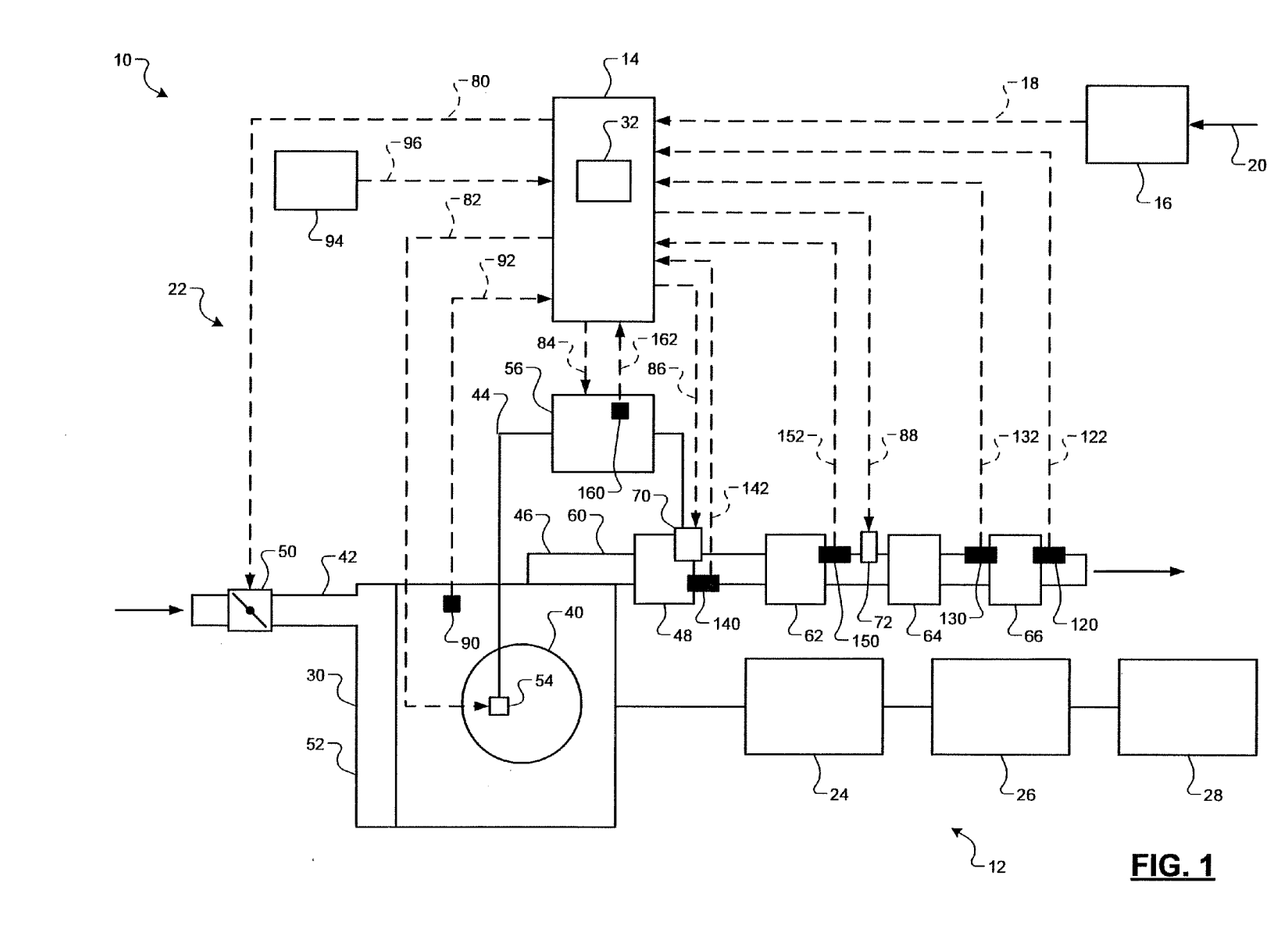
FIG. 1 is a functional block diagram of an exemplary vehicle system according to the present disclosure.

With particular reference to FIG. 1, an exemplary vehicle system 10 for a vehicle according to the present disclosure is presented. The vehicle system 10 includes a powertrain 12, a control module 14, and driver interface devices 16. Generally, the powertrain 12 produces drive torque and propels the vehicle. The control module 14 controls operation of the powertrain 12, including the drive torque produced. The control module 14 controls operation based on various inputs, including driver signals 18 output by the driver interface devices 16 and various other vehicle system signals and control values according to the present disclosure. The driver interface devices 16 output the driver signals 18 in response to driver inputs 20 made by the driver. The driver inputs 20 may include, but are not limited to, manipulating an accelerator pedal, a brake pedal, and a steering wheel. The vehicle system signals include, but are not limited to, signals output by sensors that sense various vehicle operating parameters, and control signals generated by various modules of the vehicle system 10.

The powertrain 12 includes an engine system 22, a transmission 24, and a driveline 26. The engine system 22 produces the drive torque, which is transmitted to the transmission 24. Drive torque input to the transmission 24 is transmitted at one or more gear ratios to the driveline 26, which drives one or more wheels 28. The present disclosure is not limited to transmissions or drivelines of a particular type. For example, the transmission 24 may be an automatic transmission or a manual transmission. The driveline 26 may be configured to drive one or more front and/or rear wheels 28.

The engine system 22 includes an internal combustion engine (ICE) 30 and an engine control module (ECM) 32. The engine system 22 may be a hybrid engine system including an electric motor (not shown) that produces drive torque used alone, or in combination with, the drive torque produced by the ICE 30 to propel the vehicle. The present disclosure is not limited to internal combustion engines of a particular type or configuration. For example, the ICE 30 may be a spark-ignition (SI) engine or a compression ignition (CI) engine. The ICE 30 may be a four-stroke engine or a two-stroke engine. For exemplary purposes, the ICE 30 is presented as a four-stroke, reciprocating-type, direct injection CI diesel engine having a single cylinder 40. While a single cylinder 40 is presented for simplicity, it will be appreciated that the ICE 30 may have multiple cylinders.

The ICE 30 includes the cylinder 40, an intake system 42, a fuel system 44, and an exhaust system 46. In various implementations, the ICE 30 may include a turbocharger 48 as shown. The intake system 42 includes a throttle 50 and an intake manifold 52. The throttle 50 controls a mass air flow (MAF) of intake air entering the ICE 30. The fuel system 44 includes a fuel injector 54 and a fuel tank assembly 56. The fuel injector 54 receives fuel under pressure from the fuel tank assembly 56 and controls an amount of fuel delivered to the cylinder 40. The fuel tank assembly 56 contains a volume of fuel used to supply the fuel injector 54.

During operation of the ICE 30, air is drawn into the cylinder 40 through the throttle 50 and the intake manifold 52 and mixes with fuel supplied by the fuel injector 54. The air-fuel (A/F) mixture is compressed by a piston (not shown) and combusted in the cylinder 40. Combustion of the A/F mixture drives the piston within the cylinder 40 and thereby produces the drive torque. Exhaust produced by the combustion is forced out of the cylinder 40 by the piston into the exhaust system 46.

The exhaust system 46 receives the exhaust produced by the ICE 30 and treats the exhaust to reduce concentrations of various gases in the exhaust. The exhaust system 46 further treats the exhaust to reduce PM in the exhaust. The exhaust system 46 includes an exhaust manifold 60, a diesel oxidation-type catalytic converter (DOC) 62, a selective catalytic reduction catalytic converter (SCR) 64, and a PM filter 66 interconnected by exhaust piping. The exhaust system 46 further includes a fuel injector 70 and a urea injector 72.

During operation of the ICE 30, the DOC 62 reduces the concentration of CO and HC in the exhaust by oxidizing the CO and the HC to form carbon dioxide ($CO_2$) and water ($H_2O$), respectively. The DOC 62 further reduces the concentration of nitrogen monoxide (NO) in the exhaust by oxidizing the NO to form nitrogen dioxide ($NO_2$). During regeneration of the PM filter 66, the DOC 62 is used as a catalytic burner to raise the temperature of the exhaust by combusting additional HC in a quantity of fuel injected into the exhaust by the fuel injector 70.

The SCR 64 reduces the concentration of nitrogen oxides ($NO_x$) in the exhaust, including the NO and the $NO_2$, by reducing the NO in the presence of oxygen ($O_2$) to form nitrogen ($N_2$) and $H_2O$. The SCR 64 reduces the NO using a reducing agent, such as urea injected into the exhaust by the urea injector 72.

The PM filter 66 filters PM from the exhaust exiting the DOG 62 and generally is of the wall-flow type. The present disclosure is not limited to wall-flow PM filters of a particular construction or wall-flow PM filters composed of a particular material. For example, the PM filter 66 may include an alternating arrangement of inlet and outlet channels separated by walls formed of either cordierite or silicon carbide. In this construction, exhaust enters the PM filter 66 through the inlet channels, passes through the walls into the outlet channels. PM in the exhaust is trapped by and accumulates on the walls. Accumulated PM reduces flow through the PM filter 66 and is periodically removed by regeneration.

The fuel injector 70 is located upstream of the DOC 62. The fuel injector 70 receives fuel under pressure and controls the quantity of fuel injected into the exhaust. The fuel injector 70 may receive the pressurized fuel from the fuel tank assembly 56. Together, the fuel injector 70 and the fuel tank assembly 56 can form a part of an HCl system used to inject fuel into the exhaust and thereby raise the temperature of the PM filter 66 during regeneration. The HCl system may be controlled by the ECM 32 as discussed in more detail below.

The ECM 32 controls operation of the various components of the engine system 22, including the ICE 30. The ECM 32 controls operation via timed control signals output to the various components. For purposes of the present disclosure, the control signals controlling operation of the engine system 22 will be referred to collectively as "engine system control signals." In the present example, the engine system control signals include a throttle control signal 80, an engine fuel control signal 82, a fuel supply control signal 84, an exhaust fuel control signal 86, and a urea control signal 88.

The ECM 32 regulates the drive torque produced by the ICE 30 based on various inputs, including the driver signals 18 and signals from sensors that sense various engine operating parameters. The sensors may include an engine speed sensor 90 that senses a rotational speed of the ICE 30 (engine speed) and outputs a signal 92 indicative of the engine speed sensed. Other sensors 94 may sense other engine operating parameters and output signals 96 indicative of the parameter sensed. The other sensors 94 may include an intake air temperature (IAT) sensor, a MAF sensor, a manifold absolute pressure (MAP) sensor, an engine coolant temperature (ECT) sensor, and an oil temperature (OT) sensor.

The ECM 32 also determines when to regenerate the PM filter 66. During regeneration, the ECM 32 raises the temperature of the PM filter 66 to a desired PM filter temperature above a regeneration temperature required to combust accumulated PM within the PM filter 66. The ECM 32 raises the temperature of the PM filter 66 by supplying fuel to the exhaust via the fuel injector 70 that is combusted in the DOC 62. The ECM 32 may control the temperature of the PM filter 66 by controlling a temperature of the exhaust exiting the DOC 62, which may be referred to as a DOC outlet temperature. The ECM 32 may control the DOC outlet temperature by controlling a quantity of fuel supplied by the fuel injector 70.

According to the present disclosure, the ECM 32 regulates the quantity of fuel supplied by the HCl system based on a lower heating value of the fuel. The ECM 32 further regulates the quantity of fuel supplied based on one or more measured operating parameters. In an exemplary implementation, the ECM 32 further regulates the quantity of fuel based on a measured DOC outlet temperature. The ECM 32 periodically adjusts a fuel correction associated with the lower heating value based on a difference between the measured DOC outlet temperature and the desired PM filter temperature.

According to the present disclosure, the ECM 32 further detects problems related to the delivery of the desired quantity of fuel by the HCl system by monitoring the fuel correction. An excessive fuel correction and/or sudden change in the fuel correction may indicate a problem with the operation of the fuel injector 70 and/or the supply of fuel to the fuel injector 70 by the fuel tank assembly 56. The ECM 32 diagnoses the problem by monitoring the fuel level, or volume of fuel contained by the fuel tank assembly 56, and determining whether refueling has occurred recently.

When refueling has occurred recently, the ECM 32 further diagnoses the problem by calculating a control value, a potential percent change in the lower heating value of the fuel within the fuel tank assembly 56 due to the refueling, and comparing the control value and a percent change in the fuel correction. If the percent change in the fuel correction is less than the potential percent change in the lower heating value of the fuel, the ECM 32 diagnoses the problem as a fuel-related problem, otherwise the ECM 32 diagnoses the problem as an HCl performance-related problem.

The comparison provides an additional check for distinguishing between problems associated with the HCl system. In particular, problems due to variation in the actual lower heating value of the fuel and problems with the operation of the various components of the HCl system, such as the fuel injector 70 and/or the fuel tank assembly 56, can be distinguished. The ECM 32 sets DTCs related to the performance of the HCl system based on the comparison. In this way, the ECM 32 can avoid falsely setting the performance-related DTCs due to variation in the actual lower heating value of the fuel.

Figure 2:
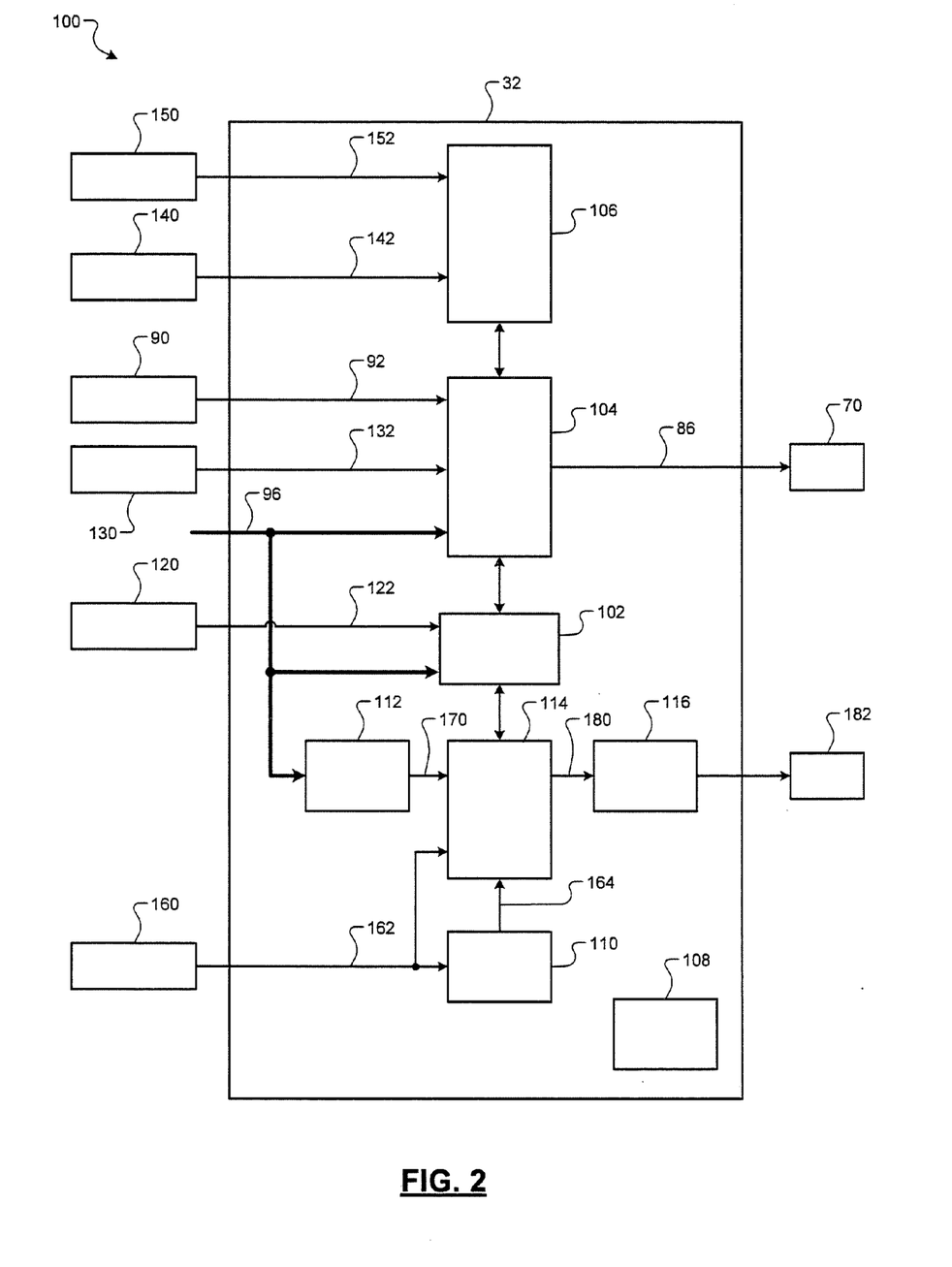
FIG. 2 is a functional block diagram of an exemplary diagnostic and control system according to the present disclosure for the HCI system shown in FIG. 1.

With particular reference to FIG. 2, an exemplary implementation of the ECM 32 in an exemplary engine diagnostic and control system 100 according to the present disclosure is presented. The ECM 32 includes a regeneration module 102, a fuel control module 104, a fuel correction module 106, and non-volatile memory 108. The ECM 32 further includes a refueling detection module 110, an error detection module 112, a diagnostic module 114, and a fault module 116. It will be appreciated that in various implementations, one or more of the modules of the ECM 32 may be combined within a single module or partitioned into one or more other modules.

The regeneration module 102 determines whether regeneration of the PM filter 66 should be performed based on various signals received and instructs the various modules of the ECM 32 when to begin and end regeneration. The present disclosure is not limited to particular methods for determining whether regeneration should be performed and when to begin and end regeneration. For example, the regeneration module 102 may determine whether regeneration should be performed based on control parameters including, but not limited to, a pressure difference in the exhaust between an inlet and an outlet of the PM filter 66 and/or an elapsed time since the PM filter 66 was last regenerated.

The engine diagnostic and control system 100 presented includes a PM filter pressure sensor 120 that measures the pressure difference in the exhaust between the inlet and the outlet of the PM filter 66 and outputs a signal 122 indicative of the measured pressure difference. The regeneration module 102 receives the signal 122 and determines the PM filter 66 should be regenerated when the measured pressure difference exceeds a predetermined pressure difference.

The fuel control module 104 generates the exhaust fuel control signal 86 during regeneration based on various signals received and thereby controls the quantity of fuel supplied by the fuel injector 70. The fuel control module 104 raises the temperature of the PM filter 66 to a desired PM filter temperature above its regeneration temperature by regulating the quantity of fuel supplied by the fuel injector 70. The fuel control module 104 regulates the quantity of fuel based on an estimated amount of heat (i.e., exotherm) required to raise the temperature of the PM filter 66 to the desired PM filter temperature.

According to the present disclosure, the fuel control module 104 regulates the quantity of fuel based on a compensated heating value. The compensated heating value is based on a predetermined heating value of the fuel and a learned fuel correction that compensates for differences in the amount of heat produced in the exhaust. According to the present example, the heating value is a lower heating value. The lower heating value may be predetermined based on observed lower heating values of the fuel available for refueling the vehicle. The lower heating value may be stored in the memory 108 for retrieval.

The fuel correction may include a real number scalar and/or a real number offset. The fuel correction may be stored in the memory 108 for retrieval and/or communicated by the fuel correction module 106. For purposes of the present disclosure, the fuel correction is a real number scalar stored in the memory 108 and the compensated heating value is a product of the predetermined heating value and the fuel correction.

The fuel control module 104 may further regulate the quantity of fuel based on a MAF rate of the exhaust (exhaust MAF rate), a measured temperature of the exhaust entering the PM filter 66 (measured PM filter inlet temperature), and a desired temperature of the exhaust entering the PM filter 66 (desired PM filter inlet temperature). The exhaust MAF rate can be determined based on the engine speed. The desired PM filter inlet temperature may be a temperature required to operate the PM filter 66 at the desired PM filter temperature. The engine diagnostic and control system 100 presented includes a PM filter inlet temperature sensor 130 that measures the temperature of the exhaust entering the PM filter 66 (PM filter inlet temperature) and outputs a signal 132 indicative of the measured PM filter inlet temperature. The engine diagnostic and control system 100 further includes the engine speed sensor 90. The fuel control module 104 receives the signals 92, 96, 132 and generates the exhaust fuel control signal 86 output to the fuel injector 70 based on the signals received.

The fuel correction module 106 communicates with the fuel control module 104 and periodically adjusts the fuel correction based on differences between an estimated amount of heat and an actual amount of heat produced in the exhaust by the fuel injected by the fuel injector 70. Initial values for the fuel correction may be predetermined and stored in the memory 108. When the fuel correction includes a scalar, such as in the present example, the scalar may initially be set to a value of 1.0. When the fuel correction includes an offset, the offset may be initially set to a value of zero.

During periods of regeneration while the fuel injector 70 is operated, the fuel correction module 106 adjusts the fuel correction stored in the memory 108 based on the differences in the estimated and actual amounts of heat produced. The estimated amount of heat can be determined based on an estimated energy content of the fuel. The fuel correction module 106 increases the fuel correction when the actual amount of heat produced is less than the estimated amount of heat. The fuel correction module 106 decreases the fuel correction when the actual amount of heat produced is greater than the estimated amount of heat.

In an exemplary implementation, the fuel correction module 106 adjusts the fuel correction based on a difference between an estimated temperature of the exhaust exiting the DOC 62 (estimated DOC outlet temperature) due to combustion of the fuel and a measured DOC outlet temperature. For example, the fuel correction module 106 may determine the estimated DOC outlet temperature based on a measured temperature of the exhaust entering the DOC 62 (DOC inlet temperature) and a measured temperature of the exhaust exiting the DOC 62 (DOC outlet temperature). The estimated DOC outlet temperature may further be determined based on the quantity of fuel requested by the fuel control module 104 and the compensated heating value. The fuel correction module 106 increases the fuel correction when the measured DOC outlet temperature is less than the estimated DOC outlet temperature. The fuel correction module 106 decreases the fuel correction when the measured DOC outlet temperature is greater than the estimated DOC outlet temperature.

The engine diagnostic and control system 100 presented includes a DOC inlet temperature sensor 140 that measures the DOC inlet temperature and outputs a signal 142 indicative of the temperature sensed. The engine diagnostic and control system 100 further includes a DOC outlet temperature sensor 150 that measures the DOC outlet temperature and outputs a signal 152 indicative of the temperature measured. The fuel correction module 106 receives the signals 142, 152 and the quantity of fuel requested by the fuel control module 104 and periodically adjusts fuel correction stored in the memory 108 based on the information received. The fuel correction module 106 may communicate the fuel correction to the fuel control module 104.

The refueling detection module 110 monitors the volume of fuel contained by the fuel tank assembly 56 and detects when a refueling event has occurred. Accordingly, the engine diagnostic and control system 100 presented includes a fuel level sensor 160 that measures the volume of fuel within the fuel tank assembly 56 and outputs a signal 162 indicative of the volume measured. Each time a refueling event is detected, the refueling detection module 110 determines an initial volume of the fuel at a start of the refueling event and a final volume of fuel at an end of the refueling event. The refueling detection module 110 may store in the memory 108 for retrieval of refueling information for each refueling event, including a time when the refueling event was detected and the initial and final volumes of fuel. Alternately or additionally, the refueling detection module 110 may communicate the refueling information to the diagnostic module 114 via a refueling signal 164 as shown. The time may be a unique time, such as a total elapsed time of operation of the ICE 30, that can be used to distinguish refueling events that occur during the same or different drive cycles of the vehicle system 10.

The error detection module 112 monitors the operation of the engine diagnostic and control system 100 by monitoring the various signals of the engine diagnostic and control system 100, including the signals 86, 92, 96, 122, 132, 142, 152, 162. Based on the signals and diagnostic criteria associated with each signal, the error detection module 112 generates an error signal 170 indicating whether an error or fault in the operation of the engine diagnostic and control system 100 has been detected.

According to the present disclosure, the error detection module 112 monitors the performance of the HCI system by monitoring the fuel correction. The error detection module 112 detects a fuel control error of the HCI system by detecting a step change error in the fuel correction. The error detection module 112 detects the step change error when a time rate of change in the fuel correction is greater than a predetermined rate. In other words, the error detection module 112 detects the step change error when a difference between a current value and a previous value of the fuel correction exceeds a predetermined difference within a predetermined first period. The error detection module 112 outputs the error signal 170 to the diagnostic module 114 and thereby informs the diagnostic module 114 when a step change error has been detected.

The diagnostic module 114 obtains the refueling information, diagnoses the step change error based on the refueling information, and sets one of an HCl performance deviation flag and a fuel deviation flag indicating the diagnosis made. More specifically, the diagnostic module 114 distinguishes between step change errors in the fuel correction caused by variation in the actual lower heating value of the fuel and step change errors caused by faulty operation of the HCl system.

The diagnostic module 114 diagnoses the step change error based on whether a refueling event has occurred within a predetermined second period prior to when the step change error was detected. The second period may be event-based or time-based. For example, the second period may correspond to a period between predetermined events, such as successive regeneration events. As another example, the second period may correspond to an estimated response time of the fuel correction to changes in the actual lower heating value of the fuel.

If no refueling events have occurred within the second period, the diagnostic module 114 diagnoses the step change error as caused by faulty operation of the HCl system and sets the HCl performance deviation flag. If a refueling event has occurred within the second period, the diagnostic module 114 diagnoses the step change error by comparing a percent change in the fuel correction and a potential percent change in the lower heating value of the fuel. The percent change in the fuel correction is calculated according to the following equation (equation 1):

$$\Delta FC \% = \frac{(FC_2 - FC_1)}{FC_1}.$$

In equation 1, $\Delta FC \%$ is the percent change in the fuel correction and $FC_2$ and $FC_1$ are the current and previous fuel corrections, respectively, triggering the step change error.

The potential percent change in the lower heating value of the fuel is a potential percent change due to the additional volume of fuel added during each refueling event occurring within the second period. The potential percent change assumes the additional fuel has a lower heating value at or near a maximum expected lower heating value of the available fuel. Generally, a period between refueling events will be greater than the second period and at most, a single refueling event may occur within the second period. Thus, in an exemplary implementation, the potential percent change in the lower heating value of the fuel is calculated according to the following equation (equation 2):

$$\Delta HV\ \% = \frac{(V_R * HV_{BASE}) + ((V_F - V_R) * HV_{POT})}{V_F}.$$

In equation 2, ΔHV % is the potential percent change in the lower heating value, $V_R$ is the volume of fuel remaining at the start of the refueling event, and $V_F$ is the volume of fuel at the end of the refueling event. $HV_{BASE}$ is the predetermined heating value and $HV_{POT}$ is a predetermined potential heating value corresponding to a heating value at or near the maximum expected lower heating value of the available fuel.

In the case where more than one refueling event has occurred during the second period, equation 2 can be modified to account for the potential percent change due to each refueling event. For example, in the case where two refueling events have occurred, the potential percent change in the lower heating value of the fuel can be calculated according to the following equation (equation 3):

$$\Delta HV\ \% = \frac{(\Delta HV\ \%1 * V_{R2}) + (\Delta HV\ \%2 * (V_{F2} - V_{R2}))}{V_{F2}}.$$

In equation 3, ΔHV %1 is the potential percent change in the lower heating value due to the first refueling event. ΔHV %1 may be calculated using equation 2 based on the volume of fuel remaining at the start of the first refueling event and the volume of fuel at the end of the first refueling event. ΔHV %2 is the potential percent change in the lower heating value due to the second refueling event. ΔHV %2 may be calculated using equation 2 based on the volume of fuel remaining at the start of the second refueling event, $V_{R2}$, and the volume of fuel at the end of the second refueling event, $V_{F2}$.

Once the diagnostic module 114 has calculated the percent change in the fuel correction, ΔFC %, and the potential percent change in the lower heating value, ΔHV %, the diagnostic module 114 compares the two values. If ΔFC % is less than or equal to ΔHV %, the diagnostic module 114 diagnoses the step change error as caused by variation in the actual heating value of the fuel and sets the fuel deviation flag. On the other hand, if ΔFC % is greater than ΔHV %, the diagnostic module 114 diagnoses the step change error as caused by faulty operation of the HCl system and sets the HCl performance deviation flag. The diagnostic module 114 generates a diagnostic signal 180 when a step change error is diagnosed, which indicates the diagnosis made.

The fault module 116 receives the diagnostic signal 180 and selectively stores an HCl system DTC in the memory 108 based on the diagnostic signal 180 and fault criteria for the HCl system DTC. The present disclosure is not limited to particular fault criteria. For example, the fault module 116 may store the HCl system DTC once the HCl performance deviation flag has been set and a predetermined number (N) of fuel control errors are diagnosed as caused by faulty operation of the HCl system. The fault criteria may include criteria for evaluating fuel control errors diagnosed as caused by variation in the actual heating value of the fuel. For example, the fault module 116 may store the HCl system DTC once the fuel deviation flag has been set and a predetermined number (M) of fuel control errors are diagnosed as caused by variation in the fuel.

When the fault module 116 has stored the HCl system DTC, the fault module 116 may also selectively illuminate a MIL lamp 182 to alert the driver that a problem with the HCl system exists. When the HCl system DTC is stored, the fuel control module 104 may initiate a remedial control strategy for supplying fuel to the exhaust during regeneration. For example, the fuel control module 104 may begin controlling the supply of fuel according to an open-loop fuel control strategy. Alternately or additionally, the fuel control module 104 may suspend regeneration until the HCl system is serviced.

Figure 3:
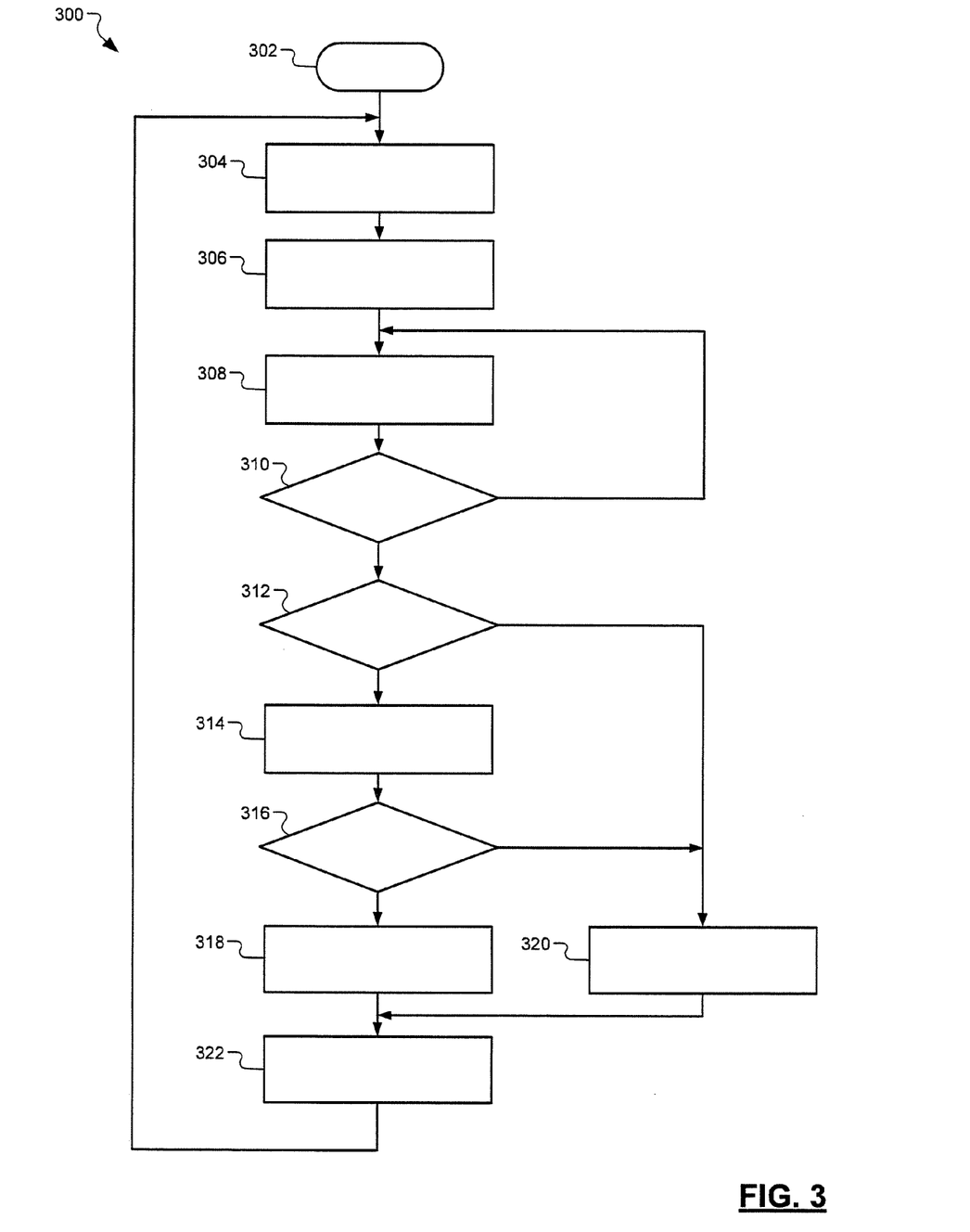
FIG. 3 is a flow diagram illustrating an exemplary method for diagnosing a fuel control error of an HCI system according to the present disclosure.

With particular reference to FIG. 3, a flowchart illustrating an exemplary method 300 for diagnosing a fuel control error of an HCl system according to the present disclosure. The method 300 may be implemented in one or more control modules of an engine control system, and more particularly, a diagnostic system for an engine. For simplicity, the method 300 will be described with reference to the engine diagnostic and control system 100 and illustrates exemplary control steps performed by the various modules of the ECM 32. Control according to the method 300 may be run during operation of the ICE 30.

A start of the method 300 is designated at 302. At 304, the refueling detection module 110 obtains the refueling information by monitoring the fuel level in the fuel tank assembly 56 and detecting when refueling has occurred. Each time a refueling event is detected, the refueling detection module 110 determines the initial and final volumes of fuel in the fuel tank assembly 56. The refueling detection module 110 stores the refueling information in the memory 108 for each refueling event, including the time when the refueling was detected and the initial and final volumes of fuel.

At 306, the fuel correction module 106, during regeneration of the PM filter 66, periodically adjusts the fuel correction stored in the memory 108. The fuel correction module 106 adjusts the fuel correction based on differences between the estimated and actual amounts of heat produced in the exhaust by the fuel injected by the fuel injector 70. More specifically, the fuel correction module 106 increases the fuel correction when the measured DOC outlet temperature is less than the estimated DOC outlet temperature. The fuel correction module 106 decreases the fuel correction when the measured DOC outlet temperature is greater than the estimated DOC outlet temperature.

At 308, the error detection module 112 detects fuel control errors of the HCl system by monitoring the fuel correction. More specifically, the error detection module 112 detects step change errors in the fuel correction when the time rate of change in the fuel correction is greater than the predetermined rate.

At 310, the diagnostic module 114 determines whether a fuel control error has been detected by the error detection module 112 based on the error signal 170. If yes, then control proceeds at 312, otherwise control loops back as shown. At 312, the diagnostic module 114 begins diagnosing the fuel control error according to 312-320 based on the refueling information obtained at 304. At 312, the diagnostic module 114 determines whether refueling has occurred recently, and more specifically, whether refueling has occurred within the predetermined second period. If yes, then control proceeds at 314, otherwise control proceeds at 320.

At 314, the diagnostic module 114 calculates the control values used to diagnose the step change error when refueling has occurred recently. More specifically, the diagnostic module calculates the percent change in the fuel correction, ΔFC %, and the potential percent change in the lower heating value of the fuel, ΔHV %.

At 316, the diagnostic module 114 determines whether the percent change in the fuel correction, $\Delta FC\%$, is less than or equal to the potential percent change in the lower heating value of the fuel, $\Delta HV\%$. If yes, then control proceeds at 318, otherwise control proceeds at 320.

At 318, the diagnostic module 114 diagnoses the fuel control error as caused by variation in the fuel and sets the fuel deviation flag in the memory 108. From 318, control returns to the start as shown.

At 320, the diagnostic module 114 diagnoses the fuel control error as caused by faulty operation of the HCl system and sets the HCl performance deviation flag in the memory 108.

At 322, the fault module 116 selectively stores the HCl system DTC based on the diagnoses made at 318 and 320 and the fault criteria for the HCl system DTC. From 322, control returns to start as shown.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic system for an engine, comprising:
    a fuel control module that supplies a quantity of fuel directly to an exhaust system of said engine based on a fuel correction value;
    a fuel correction module that selectively adjusts said fuel correction value based on a difference between an amount of heat produced by combusting said quantity of fuel and an estimated heat production of said quantity of fuel;
    an error detection module that selectively detects a fuel control error based on a change in said fuel correction value; and
    a diagnostic module that determines that a cause of said fuel control error is faulty operation of a fuel injection system when a period since a last refueling event is greater than a predetermined period and that, when said period is less than said predetermined period, determines that said cause of said fuel control error is one of faulty operation of said fuel injection system and variation in a heating value of said fuel.

2. The diagnostic system of claim 1, wherein said error detection module detects said fuel control error when said change in said fuel correction value is greater than a predetermined value.

3. The diagnostic system of claim 1, wherein, when said period is less than said predetermined period, said diagnostic module determines said cause based on a first amount of said fuel contained in a fuel tank at a start of said last refueling event and a second amount of said fuel added to said fuel tank during said last refueling event.

4. The diagnostic system of claim 3, wherein, when said period is less than said predetermined period, said diagnostic module:
    determines said cause based on a first percent change in said fuel correction value and a second percent value; and
    determines said second percent value based on said first percent change and said second percent value.

5. The diagnostic system of claim 4, wherein said diagnostic module determines that said cause is a variation in a heating value of said fuel when said first percent change is less than said second percent value.

6. The diagnostic system of claim 4, wherein said diagnostic module determines that said cause is faulty operation of said fuel injection system used to supply said fuel to said exhaust system when said first percent change is greater than said second percent value.

7. The diagnostic system of claim 1, wherein said diagnostic module determines said cause based on a second period between successive regeneration events of a particulate matter filter.

8. A method for an engine, comprising:
    supplying a quantity of fuel directly to an exhaust system of said engine based on a fuel correction value;
    selectively adjusting said fuel correction value based on a difference between an amount of heat produced by combusting said quantity of fuel and an estimated heat production of said quantity of fuel;
    selectively detecting a fuel control error based on a change in said fuel correction value;
    determining that a cause of said fuel control error is faulty operation of a fuel injection system when a period since a last refueling event is greater than a predetermined period; and
    determining that said cause of said fuel control error is one of faulty operation of said fuel injection system and variation in a heating value of said fuel when said period is less than said predetermined period.

9. The method of claim 8, wherein said selectively detecting includes detecting said fuel control error when said change in said fuel correction value is greater than a predetermined value.

10. The method of claim 8 further comprising, when said period is less than said predetermined period, determining said cause based on a first amount of said fuel contained in a fuel tank at a start of said last refueling event and a second amount of said fuel added to said fuel tank during said last refueling event.

11. The method of claim 10 further comprising, when said period is less than said predetermined period:
    determining said cause based on a first percent change in said fuel correction value and a second percent value; and
    determining said second percent value based on said first percent change and second percent value.

12. The method of claim 11, wherein said determining further includes determining said cause is a variation in a heating value of said fuel when said first percent change is less than said second percent value.

13. The method of claim 11, wherein said determining further includes determining that said cause is faulty operation of said fuel injection system used to supply said fuel to said exhaust system when said first percent change is greater than said second percent value.

14. The method of claim 8, wherein said determining further includes determining said cause based on a second period between successive regeneration events of a particulate matter filter.

* * * * *